July 25, 1950     E. F. OSBORN     2,516,249
FORSTERITE REFRACTORY MADE FROM NATURAL
MAGNESIUM SILICATES
Filed Nov. 12, 1948
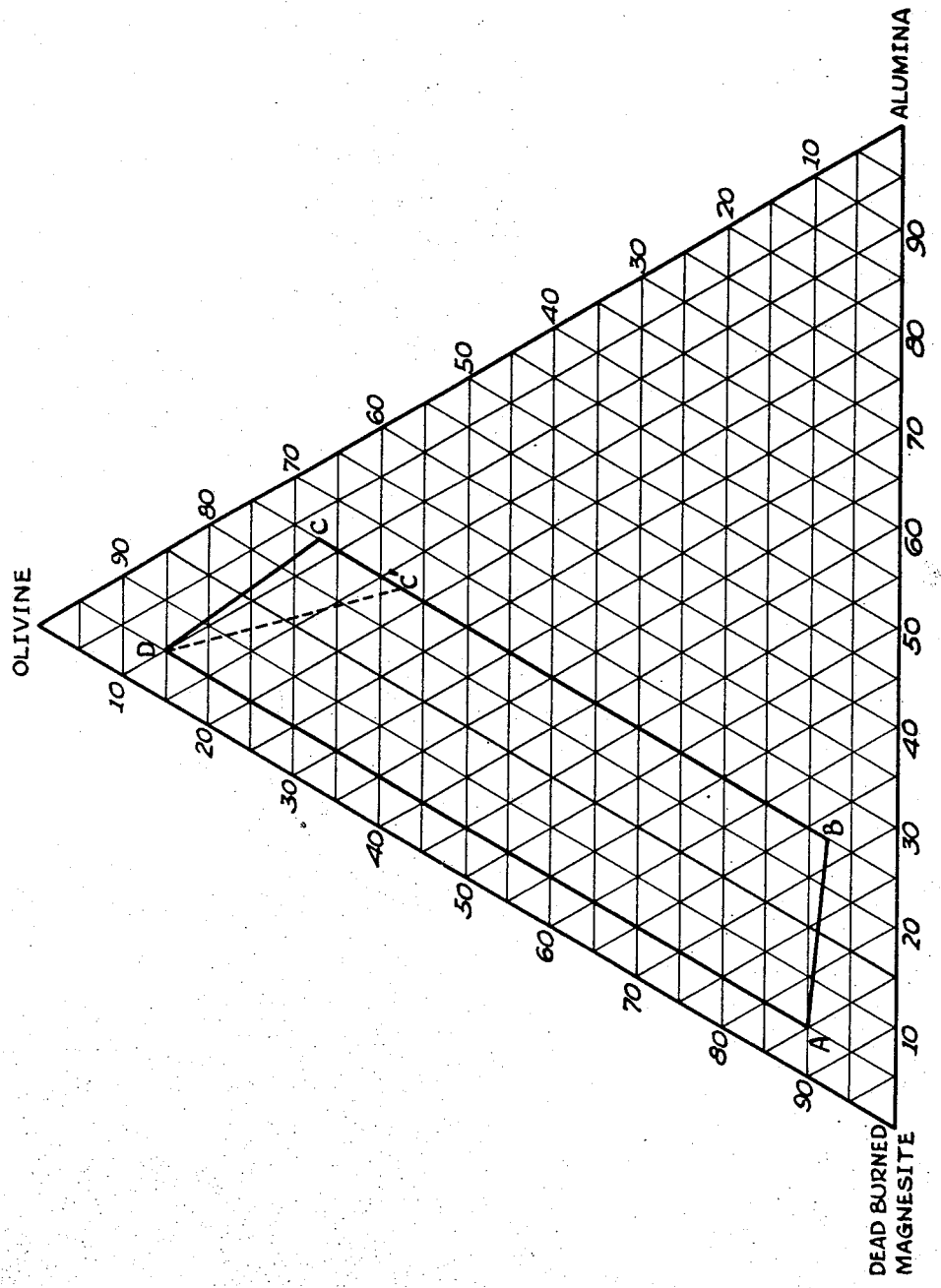
INVENTOR.
ELBURT F. OSBORN.

Patented July 25, 1950

2,516,249

UNITED STATES PATENT OFFICE 2,516,249

FORSTERITE REFRACTORY MADE FROM NATURAL MAGNESIUM SILICATES

Elburt F. Osborn, State College, Pa., assignor to Harbison-Walker Refractories Company, Pittsburgh, Pa., a corporation of Pennsylvania Application November 12, 1948, Serial No. 59,724

15 Claims. (Cl. 106—60)

This invention relates to forsteritic refractories made from natural magnesium silicates, and more particularly from Mg-Fe olivines.

Of recent years refractory shapes, such as bricks, consisting largely of forsterite (magnesium orthosilicate—2MgO.SiO₂), or made from forsterite with other non-acidic refractory materials, such as chrome ore, have been used on an increasingly large scale. The satisfactory character of such brick that has led to their increasing popularity is due in part to the very high melting point of forsterite, 3470° F., which confers high refractoriness. It has been due in part also to the good strength characteristics of the brick coupled with the fact that their spalling resistance is better than that of ordinary magnesite brick. Thus, under the standard A. S. T. M. load test forsterite brick sustain a load of 25 p. s. i. to temperatures in excess of 2850° F. These and other properties have resulted in extensive use of such basic refractories in high temperature furnaces. The properties of forsterite refractories are such also that they have been considered to be particularly suited for the construction of checkers of glass tank regenerators.

A common practice is to make forsterite brick from Mg-Fe olivines, which are natural magnesium silicates; in such cases finely divided magnesia is added for the purpose of converting any more siliceous magnesian minerals carried in the olivine rock to the more highly refractory forsterite. They have been made also from other natural magnesium silicates of relatively low refractoriness, for example such alteration products of other magnesium silicates as serpentine and talc, or steatites, by the addition of sufficient magnesia to form forsterite from the more siliceous magnesium silicates and hydrosilicates.

Extended use of forsterite brick made from such natural magnesium silicates has shown that under the conditions encountered in many high temperature applications they give markedly successful and satisfactory performance. However, it has been found that such forsterite brick undergo progressive deterioration when they are exposed at elevated temperatures alternately to oxidizing and reducing conditions, exemplified by the cyclic operation of glass tank regenerators. More in detail, these brick under such cyclic conditions undergo progressive loss of bond, and ultimately they disintegrate. Accompanying those phenomena is an expansion that may amount to as much as 5 per cent, with the possibility of creating undesirable stress conditions in the structure.

A primary object of this invention is to provide a method of stabilizing forsterite brick, and other shapes, made from magnesia and natural magnesium silicates, particularly Mg-Fe olivines, against objectionable changes when the shapes are exposed at elevated temperatures cyclically to oxidizing and reducing conditions, which method is simple, easily performed, involves no substantial alteration in existing methods of manufacture, and accomplishes the stabilizing action not only without depreciation of desirable properties but with actual benefit to certain mechanical properties of the shapes.

A further object is to provide forsterite refractories made from natural magnesium silicates and magnesia that are stabilized against deterioration when exposed at elevated temperatures cyclically to oxidizing and reducing conditions.

Other objects will appear from the following specification.

The invention will be described with reference to the accompanying drawing which is a triaxial diagram in which there are represented the compositions of this invention.

I have discovered, and the invention is in large part predicated on this, that the tendency of forsteritic refractory shapes made from natural magnesium silicate and magnesia to undergo objectionable changes when exposed at elevated temperatures alternately to oxidizing and reducing conditions, such as those encountered in the checkers of glass tank regenerators, may be overcome by incorporating substantial amounts of alumina in the magnesia-natural magnesium silicate mix from which the shapes are made.

In this way the shapes are stabilized against the loss of bond and expansion that ultimately have caused disintegration of the forsterite brick heretofore made from natural magnesium silicates and magnesia when exposed to such cyclic conditions. Moreover, as will appear hereinafter, certain mechanical properties of the shapes are substantially enhanced.

In the making of forsterite brick various natural magnesium silicates may be and are used, based upon the consistent practice of compounding such silicates with magnesia to convert the more siliceous silicates to forsterite. For most purposes it is preferred to use olivines, most suitably the Mg-Fe olivines containing not over about 10 per cent of FeO, examples being dunites and peridotites. Although the olivine should not contain over about 10 per cent of FeO, it will be understood that satisfactory results may be had by blending olivines of higher iron content with those of lower iron content to provide a mixture conforming to that specification. By way of example, an olivine of the following analysis has given excellent results in the practice of the invention:

| | Per cent |
|---|---|
| $SiO_2$ | 40.0 |
| $Al_2O_3$ | 0.4 |
| $FeO$ | 9.0 |
| $CaO$ | 0.2 |
| $MgO$ | 48.3 |
| $Cr_2O_3$ | 1.3 |

Other magnesium silicates, such as serpentine and steatites, may likewise be used, as is known in the forsterite refractory art, provided that sufficient magnesia is incorporated in the batch to insure the production of forsterite from the magnesium silicates and hydrosilicates containing silica in excess of that in magnesium orthosilicate.

The magnesia (MgO) used in practicing the invention should be in high density form, e. g., dead burned, sintered, or fused. Magnesia in such form is termed dead burned magnesite. It may be supplied by the dead burning of, for example, magnesite or brucite. Dead burned synthetic magnesia, such as that produced from sea water, may likewise be applied satisfactorily in the practice of the invention. An example of a magnesia that has given satisfactory results in the practice of the invention is as follows:

| | Per cent |
|---|---|
| $SiO_2$ | 5.0 |
| $Al_2O_3$ | 1.8 |
| $CaO$ | 2.6 |
| $Fe_2O_3$ | 3.5 |
| $MgO$ | 87.1 |

The alumina ($Al_2O_3$) that acts as the stabilizing agent in accordance with this invention is preferably supplied as such, suitably in the ordinary form produced by the well-known Bayer process. However, it may be supplied also by bauxites and similar natural aluminous ores consisting mostly of alumina.

In accordance with the invention, to repeat, its objects are attained by the addition of alumina to refractory batches of natural magnesium silicate and dead burned magnesite. In the practice of the invention the bricks or other shapes are made from batches containing natural magnesium silicate, dead burned magnesite and alumina in proportions defined by the field A—B—C—D shown on the accompanying triaxial diagram. From this it will be observed that the features that characterize the invention derive from the addition of from 5 to 25 per cent of alumina to refractory mixes of natural magnesium silicate and dead burned magnesite.

In the case of Mg-Fe olivine as the natural magnesium silicate the entire field A—B—C—D is applicable for the purposes of the invention. Where, however, the natural magnesium silicate used is serpentine, talc or the like weathered, or alteration, product of another natural magnesium silicate, the compositions toward the upper end of the field will need somewhat more magnesite, say about 10 per cent more, than represented by the line C—D. Likewise, line C—D represents magnesite of substantially 100 per cent MgO content. Therefore with less pure magnesite the line C—D will shift downwardly to an extent dependent upon the MgO content. For example, in the case of the illustrative magnesite composition cited above the lower limits for magnesite would lie substantially as shown at C'—D.

In the preferred embodiment of the invention the shapes are made from, by weight, about 5 to 25 per cent of alumina, or material equivalent to that, and about 95 to 75 per cent of a mixture composed of, by weight, about 30 to 90 per cent of Mg-Fe olivine and about 10 to 70 per cent of dead burned magnesite.

Within the foregoing field and ranges the proportions will be varied, as will be understood by those familiar with the making of refractories, according to the particular natural magnesium silicate that is used, the mode of supplying $Al_2O_3$, the grind of the constituents, the properties to be produced, and related factors. Typical compositions will be understood from the examples presently to be cited.

Bricks and other shapes may be made from such compositions in accordance with standard or desired practices. The olivine or other natural magnesium silicate will be crushed to provide desired screen analysis. Most suitably the magnesite is crushed until a substantial part of it passes a 65-mesh screen, and for the best results the alumina should substantially wholly pass a 200-mesh screen. The materials may be dry mixed, water or other liquid then added to bring the batch to proper pressing consistency, and the bricks formed under high pressure. A screen grading of olivine that has been found to be particularly suited to the practice of the invention is as follows:

| | Per cent |
|---|---|
| Pass 6 on 10 mesh | 14 |
| Pass 10 on 28 mesh | 28 |
| Pass 28 on 65 mesh | 33 |
| Pass 65 | 25 |

When working in portions of the composition range where the percentage of magnesite is high and in particular where it exceeds that of the olivine, not all of the magnesite will be of fine grind (e. g., passing 65 mesh). Instead, it will be graded in a manner similar to that illustrated above for the olivine. The guiding principles are that (1) regardless of the relative percentages of olivine and magnesite, there must in all cases be a certain percentage of fine magnesite (e. g., 10 per cent of the batch) so that it will be available for ready reaction with other constituents, and that (2) the entire refractory batch shall be made up in accordance with effective grading principles to give amply high packing density. Such principles of grading are well known in the art and require that there be coarse particles as well as fine ones.

The bricks or other shapes after pressing may then be dried and burned in accordance with regular practice in the production of forsterite bricks. Or, if desired, they may be of the so-called chemically bonded type in which there is added to the batch before pressing a temporary bonding agent that acts to confer sufficient strength upon the bricks when dried to permit their being handled, shipped and erected, with the burning being accomplished in the use of the resultant structure. A considerable variety of such temporary binders, both organic and inorganic in nature, have been used for the production of chemically bonded brick, a common example being a concentrate from waste lignin liquor. Among the other temporary bonding agents that have been used are magnesium chloride, magnesium sulfate, and sulphuric acid, although various others are well known.

As exemplifying the benefits to be derived from the invention, reference will now be made to tests of a series of bricks of varying composition made in accordance with this invention and subjected to conditions simulating those existing in a glass tank regenerator, in comparison with similar brick made from the same materials but without the alumina the use of which characterizes this invention. All of the brick were made from olivine and magnesite of the analysis given above, and the olivine was of the exemplary grind just given. Bayer process alumina was used, and substantially all of it passed 200-mesh. The materials were blended dry in a Clearfield mixer for five minutes, after which 2 per cent by weight of organic binder and sufficient water to provide good pressing consistency were added, and the bricks were formed at 4000 p. s. i. The bricks were then air dried and burned in a batch kiln to Cone 23. Some of the bricks were then subjected to standard tests to determine certain mechanical properties, and others were tested to determine their behavior when exposed cyclically to alternate reduction and oxidation. This was accomplished by heating the bricks at 2200° F. and passing through the furnace alternately for 15 minute intervals an oxidizing atmosphere (air) and then a reducing atmosphere consisting of 12 per cent by volume of carbon monoxide and 88 per cent of nitrogen, thus providing 30-minute cycles. The latter atmosphere is more highly reducing than would ordinarily be experienced in glass tank regenerators, but was chosen for the laboratory tests so as to bring about an acceleration of the action that might be obtained only after 6 to 18 months in regenerator service.

The compositions of these bricks and certain of their mechanical properties appear in Table I. The results of the cyclic exposure to oxidizing and reducing atmospheres are given in Table II:

Table I

|  | A | B | C | D | E |
|---|---|---|---|---|---|
| Olivine, per cent | 80 | 76 | 72 | 54 | 51 |
| Dead Burned Magnesite, per cent | 20 | 19 | 18 | 36 | 34 |
| Al₂O₃, per cent | | 5 | 10 | 10 | 15 |
| Load Test: | | | | | |
| Subsidence began, °C | (¹) | 1,600 | 1,600 | 1,600 | 1,625 |
| Failure, °C | 1,683 | 1,665 | 1,660 | 1,665 | 1,664 |
| Mod. Rupture, p. s. i | 590 | 920 | 1,080 | 1,200 | 1,390 |

¹ No subsidence, failed suddenly in shear.

Table II

| Brick | Cycles No. | Linear Expansion | Remarks |
|---|---|---|---|
| | | Per cent | |
| A | 106 | 5.0 | Friable, badly weakened. |
| B | 687 | 1.5 | Strong. |
| C | 696 | 0.8 | Do. |
| D | 612 | 1.5 | Do. |
| E | 684 | 1.5 | Do. |

As appears clearly from Table II, brick A, characteristic of forsterite brick without alumina were friable and had undergone 5 per cent expansion after an exposure of only 106 cycles. In marked contrast bricks B to E, representative of the present invention and containing varying amounts of alumina, were still strong and had undergone only slight expansion after more than 600 cycles of alternate oxidation and reduction, thus showing the strong stabilizing effect produced by the addition of alumina to the olivine-magnesia batch.

Further remarkable and unpredictable results of the addition of alumina to forsterite brick appear equally clearly from the data of Table I. In the first place, the presence of alumina in these forsterite brick greatly increases the modulus of rupture, which is, of course, highly desirable because the cold strength of burned brick is thereby increased. That is, although the spalling resistance of magnesite-olivine brick is better than that of magnesite brick, the former are so weak, or friable, that they are not adapted to the frequently encountered services where severe abrasion is experienced. However, when alumina is added in accordance with this invention the burned strength is improved markedly so that if desired the magnesite-olivine-alumina brick may be burned before shipment.

Equally surprising is the effect of alumina upon the brick when subjected to the standard 25-lb. load test. It is characteristic of the forsterite brick known prior to my invention that when subjected to load at high temperatures they fail suddenly, without warning, in shear. The data of Table I show that the alumina-containing forsterite brick of this invention behave entirely differently in that prior to failure they exhibit subsidence, which is likewise a desirable property under some conditions because this ability to yield under load, instead of fracturing suddenly, acts to relieve stress and minimize spalling and shear failure.

As conditions may seem to recommend, it may be advisable at times to precalcine all or any part of the constituents of the mixture.

According to the provisions of the patent statutes, I have explained the principle and mode of practicing my invention, and have illustrated and described what I now consider to represent its best embodiment. However, I desire to have it understood that, within the scope of the appended claims, the invention may be practiced otherwise than as specifically illustrated and described.

I claim:

1. In the production of forsteritic refractory shapes from mixtures of natural magnesium silicate and dead burned magnesite, the method of stabilizing the shapes against deterioration when exposed cyclically at elevated temperatures alternately to oxidizing and reducing atmospheres that comprises adding an alumina-rich material to said mixture to supply from about 5 to 25 per cent of free alumina thereto.

2. A method according to claim 1, said silicate being a Mg-Fe olivine containing not more than about 10 per cent of FeO.

3. A method according to claim 1, said alumina-rich material being alumina.

4. A method according to claim 1, said silicate being a Mg-Fe olivine containing not over about 10 per cent of FeO, and said alumina-rich material being alumina.

5. In a method of making refractory shapes the steps of providing a refractory batch comprising an alumina-rich material, natural magnesium silicate and dead burned magnesite, in proportions by weight, defined by the area A—B—C—D of the accompanying drawing, and forming said batch into shapes.

6. In a method of making refractory shapes the steps of providing a refractory batch comprising, by weight, about 5 to 25 per cent of free alumina and about 95 to 75 per cent of refractory material composed of, by weight, about 30 to 90 per cent of olivine and about 70 to 10 per cent of dead burned magnesite, and forming said batch into shapes.

7. A method according to claim 5, said silicate being a Mg-Fe olivine containing not more than about 10 per cent of FeO.

8. A method according to claim 6, said olivine containing not over about 10 per cent of FeO.

9. Refractory shapes formed from an alumina-rich material, natural magnesium silicate, and dead burned magnesite in proportions by weight, defined by the area A—B—C—D of the accompanying drawing.

10. Shapes according to claim 9, said silicate being a Mg-Fe olivine containing not over about 10 per cent of FeO.

11. Shapes according to claim 9, said alumina-rich material being alumina.

12. Burned shapes according to claim 9.

13. Burned shapes according to claim 9, said silicate being a Mg-Fe olivine containing not over about 10 per cent of FeO.

14. Refractory shapes formed of, by weight, about 5 to 25 per cent of free alumina and 95 to 75 per cent of refractory material composed of, by weight, about 30 to 90 per cent of Mg-Fe olivine and 70 to 10 per cent of dead burned magnesite.

15. Refractory shapes formed from forsterite producing batch of natural magnesium silicate and dead burned magnesite, together with about 5 to 25 per cent by weight of free alumina.

ELBURT F. OSBORN.

REFERENCES CITED

The following references are of record in the file of this patent:

UNITED STATES PATENTS

| Number | Name | Date |
|---|---|---|
| 2,315,198 | Goldschmidt | Mar. 30, 1943 |